(12) United States Patent
Ghabra et al.

(10) Patent No.: US 7,944,340 B1
(45) Date of Patent: *May 17, 2011

(54) SYSTEM AND METHOD FOR TWO-WAY REMOTE ACTIVATION WITH ADAPTIVE PROTOCOL

(75) Inventors: Riad Ghabra, Dearborn Heights, MI (US); Ronald O. King, Brownstown, MI (US); John S. Nantz, Brighton, MI (US); Tom Q. Tang, Novi, MI (US); Yi Luo, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 903 days.

This patent is subject to a terminal disclaimer.

(21) Appl. No.: 11/536,187

(22) Filed: Sep. 28, 2006

(51) Int. Cl.
*G05B 11/01* (2006.01)
*G08C 19/16* (2006.01)

(52) U.S. Cl. ............... 340/12.22; 340/426.17; 307/10.1
(58) Field of Classification Search .................. None
See application file for complete search history.

(56) References Cited

U.S. PATENT DOCUMENTS

| | | |
|---|---|---|
| 5,079,768 A | 1/1992 | Flammer |
| 5,245,346 A | 9/1993 | Nishimura et al. |
| 5,751,197 A | 5/1998 | Boling, III |
| 6,101,428 A | 8/2000 | Snyder |
| 6,169,492 B1 | 1/2001 | Dabbish |
| 6,212,240 B1 * | 4/2001 | Scheibel et al. ............. 375/261 |
| 6,420,967 B1 | 7/2002 | Ghabra et al. |
| 6,424,056 B1 | 7/2002 | Irvin |
| 6,519,279 B1 * | 2/2003 | Abdesselem et al. ......... 375/219 |
| 6,549,115 B1 | 4/2003 | Daiss et al. |
| 6,586,988 B2 | 7/2003 | Arisawa |
| 6,617,961 B1 | 9/2003 | Janssen et al. |
| 6,624,758 B1 * | 9/2003 | Omata et al. ............. 340/426.36 |
| 6,629,776 B2 | 10/2003 | Bell et al. |
| 6,714,119 B1 | 3/2004 | Mindl et al. |
| 6,718,240 B1 | 4/2004 | Suda et al. |
| 6,738,394 B1 | 5/2004 | Kreuzgruber et al. |
| 6,885,282 B2 | 4/2005 | Desai et al. |
| 6,885,283 B2 | 4/2005 | O'Connor et al. |
| 6,980,925 B2 | 12/2005 | Zheng et al. |
| 7,095,316 B2 | 8/2006 | Kachouh et al. |
| 7,102,498 B2 | 9/2006 | Desai et al. |
| 2003/0076221 A1 | 4/2003 | Akiyama et al. |
| 2003/0122660 A1 | 7/2003 | Kachouh et al. |
| 2004/0036625 A1 | 2/2004 | Omata et al. |
| 2005/0003781 A1 | 1/2005 | Kunz et al. |
| 2005/0083175 A1 | 4/2005 | Yanagimoto |
| 2005/0134428 A1 | 6/2005 | Desai et al. |
| 2005/0182306 A1 | 8/2005 | Sloan |
| 2005/0232376 A1 | 10/2005 | Liem et al. |
| 2005/0272436 A1 | 12/2005 | Trott et al. |

(Continued)

OTHER PUBLICATIONS

Office Action for U.S. Appl. No. 11/536,200 dated Dec. 29, 2009.

(Continued)

*Primary Examiner* — Brian A Zimmerman
*Assistant Examiner* — Sara Samson
(74) *Attorney, Agent, or Firm* — Brooks Kushman P.C.

(57) ABSTRACT

A system and method for remote activation of a device includes, in one embodiment, receiving a signal indicative of a range from the device, comparing the range to a threshold, selecting a first transmission protocol when the range exceeds the threshold, selecting a second transmission protocol when the range fails to exceed the threshold, and transmitting a command signal according to the selected first or second transmission protocol.

17 Claims, 2 Drawing Sheets

U.S. PATENT DOCUMENTS

| | | | |
|---|---|---|---|
| 2006/0077037 | A1 | 4/2006 | Luo et al. |
| 2006/0093026 | A1 | 5/2006 | Montojo et al. |
| 2006/0125599 | A1* | 6/2006 | Ghabra et al. ............... 340/5.61 |
| 2006/0139158 | A1 | 6/2006 | Miller et al. |
| 2006/0232377 | A1 | 10/2006 | Witkowski |
| 2006/0267744 | A1 | 11/2006 | Baumgartner |
| 2007/0164876 | A1 | 7/2007 | Ostrander et al. |

OTHER PUBLICATIONS

Office Action for U.S. Appl. No. 11/536,209 dated Aug. 25, 2009.
Final Office Action for U.S. Appl. No. 11/536,209 dated Nov. 10, 2009.
United States Patent and Trademark Office, Office Action for U.S. Appl. No. 11/536,225 mailed Sep. 17, 2009.
United States Patent and Trademark Office, Office Action for U.S. Appl. No. 11/536,255 mailed Aug. 19, 2009.
United States Patent and Trademark Office, Notice of Allowance and Fee(s) Due for U.S. Appl. No. 11/536,290 mailed Feb. 4, 2010.
United States Patent and Trademark Office, Final Office Action for U.S. Appl. No. 11/536,290 mailed Nov. 25, 2009.
United States Patent and Trademark Office, Office Action for U.S. Appl. No. 11/536,290 mailed Sep. 17, 2009.
Final Office Action for U.S. Appl. No. 11/536,225 dated Mar. 3, 2010.
Office Action for U.S. Appl. No. 11/536,209 dated Mar. 10, 2010.
Office Action for U.S. Appl. No. 11/536,209 dated Jun. 4, 2010.
Office Action for U.S. Appl. No. 11/536,255 dated Mar. 16, 2010.
Office Action for U.S. Appl. No. 11/536,225 dated Jul. 20, 2010.
Office Action for U.S. Appl. No. 11/536,200 dated Jun. 23, 2010.
Office Action for U.S. Appl. No. 11/536,209 dated Oct. 27, 2010.
Office Action for U.S. Appl. No. 11/536,200 dated Oct. 5, 2010.
Office Action for U.S. Appl. No. 11/536,225 dated Jan. 18, 2011.
Notice of Allowance for U.S. Appl. No. 11/536,255 dated Jan. 21, 2011.
Final Office Action for U.S. Appl. No. 11/536,209 dated Feb. 18, 2011.
Final Office Action for U.S. Appl. No. 11/536,200 dated Mar. 10, 2011.

* cited by examiner

SYSTEM AND METHOD FOR TWO-WAY REMOTE ACTIVATION WITH ADAPTIVE PROTOCOL

TECHNICAL FIELD

The following relates to a system and method for wireless remote activation of devices in a vehicular environment.

A detailed description and accompanying drawings are set forth below.

DETAILED DESCRIPTION

Figure 1:
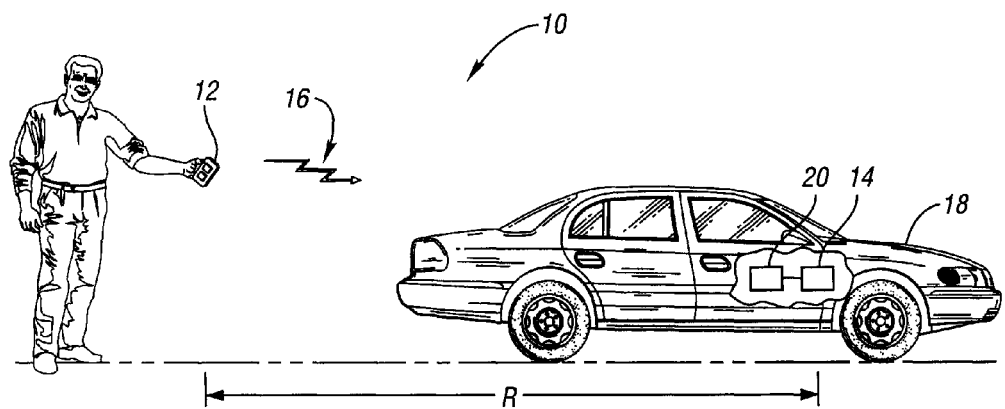
FIG. 1 is a simplified, exemplary environmental block diagram depicting one embodiment of the system described herein.
Figure 2:
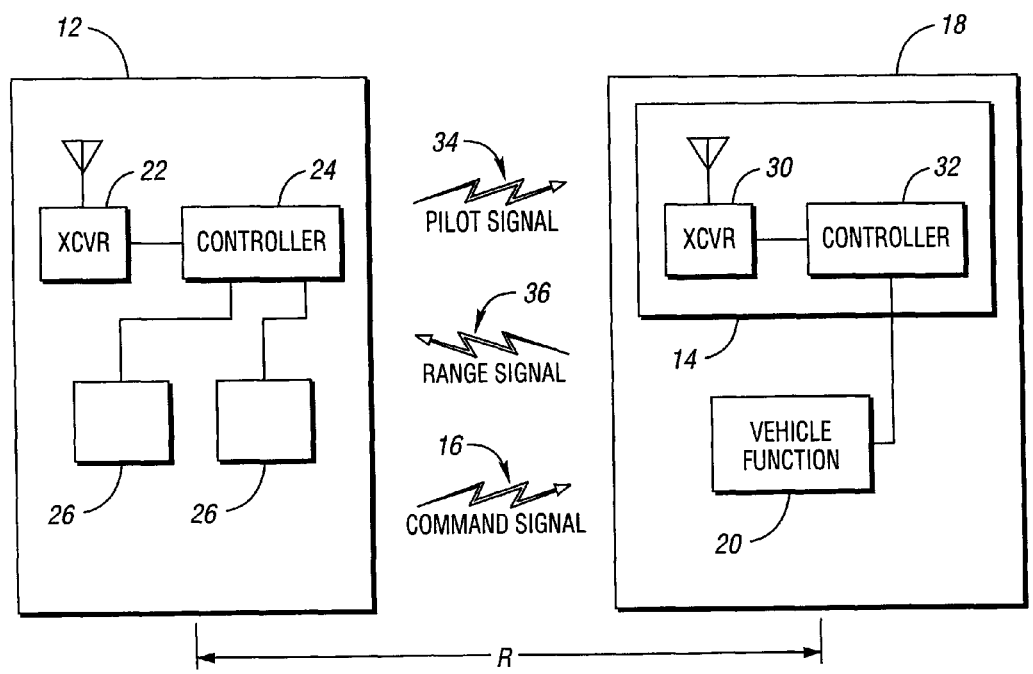
FIG. 2 is a simplified, exemplary block diagram depicting one embodiment of the system described herein.
Figure 3:
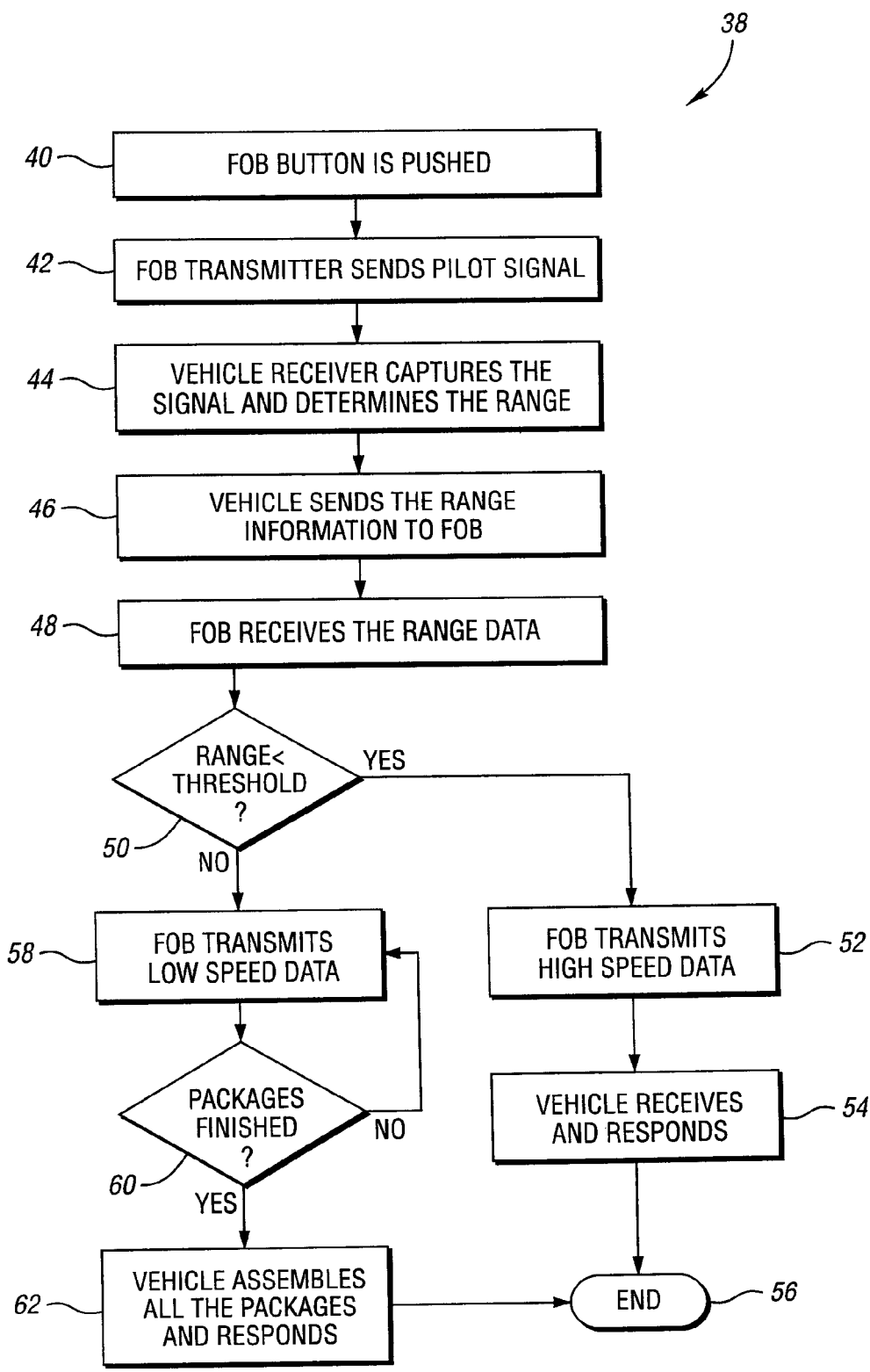
FIG. 3 is a simplified, exemplary flowchart depicting one embodiment of the method described herein.

With reference to FIGS. 1-3, a more detailed description of embodiments of the system and method and various components thereof will now be provided. It is well known in the automotive industry to provide wireless communication systems in vehicles for a variety of applications. These include, but are not limited to, remote keyless entry (RKE), tire pressure monitoring, remote control of garage door opening systems, vehicle immobilization, voice activated controls, and others.

Typical RKE systems provide for remote control by a vehicle owner or user of vehicle security systems, door locks, trunk latch, exterior and/or interior lights, horn and/or alarms. Other vehicle systems or operations that may be remotely controlled by a vehicle user or owner with RKE systems include sliding-door or lift-gate control, remote engine start, vehicle interior climate control, and others.

In that regard, RKE systems for remote vehicle access and other remote operations include a remote control device or unit, which is commonly referred to as a "fob" or "key fob." The remote control device has a transmitter, and wireless radio frequency ("RF") signals are transmitted by transmitter of the remote control device that include commands for performing vehicle operations or functions such as unlocking the vehicle doors or starting the vehicle engine. Currently available RKE fobs are hand-held, portable devices, and may be separate units or may be part of an ignition key head.

Such RKE systems also typically include a receiver and/or device control unit installed in the vehicle. RF command signals transmitted by the remote control unit are received by the vehicle-mounted receiver and/or device control unit, and may be relayed to appropriate control circuitry, systems or subsystems in the vehicle in order to effectuate the desired operation or function. For example, the receiver and/or control unit may be provided in direct or indirect (e.g., over a vehicle bus) communication with door locking mechanisms to lock and unlock the vehicle doors in response to lock or unlock signals received from the remote unit. Similarly, the receiver and/or control unit may be provided in communication with other vehicle devices to control operation thereof in response to other signals received from the remote unit.

RKE systems may be active or passive in nature. Active systems require a vehicle owner or user to manually transmit a command signal, such as by actuating one or more pushbuttons provided on the remote control unit. In passive systems, signals are automatically transmitted so that, for example, a vehicle door may be unlocked as the vehicle owner or user approaches the vehicle and/or touches the door handle to open the door, without the need for any action by the vehicle owner or user.

In that regard, in a passive keyless entry system, a remote unit, which may be referred to as a "fob" or a "card," is typically provided with a transceiver for communicating with a transceiver and/or control unit installed in the vehicle.

In such systems, the remote unit carried by an operator may be used, for example, to automatically unlock the vehicle as the operator approaches the vehicle, without the need for operation of any switch or pushbutton by the operator. Similarly, the system may further be designed to automatically lock the vehicle as the operator, carrying the remote unit, moves away from the vehicle. A vehicle-mounted transceiver and/or control unit is again provided in direct or indirect communication with control circuitry, systems or subsystems to effectuate a particular operation in response to signals received from the remote unit, such as door locking mechanisms to lock and unlock the vehicle doors.

To prevent unauthorized entry into a vehicle equipped with an RKE system, command signals from remote control units are typically encrypted, such as with a rolling-code encryption scheme where a security code is transmitted with the command signal, that code being different with every transmission. The vehicle-mounted device that receives the command signals is equipped with the same rolling-code encryption scheme in order to de-crypt a received command signal and determine which security code to expect with each command signal received. As a result, even if a command signal is intercepted by a third party, that signal cannot later be re-transmitted by the third party in order to gain entry into the vehicle, since the security code transmitted with that command signal will no longer be accepted as valid by the vehicle-mounted receiver and/or control unit.

RKE system are referred to as "one-way" systems where communication or transmission of signals only takes place from the portable remote control device having a transmitter to the vehicle-mounted device having a receiver. However, as is again well known by those of ordinary skill, RKE systems may also be "two-way" in nature. In "two-way" RKE systems, the portable remote control device carried by the vehicle user or owner includes a transceiver, and the vehicle-mounted device also includes a transceiver. As both the remote control device and the vehicle-mounted device are capable of transmitting and receiving wireless signals, two-way communication between those devices is enabled.

Signals transmitted to or from the portable remote control device and/or the vehicle-mounted device in "two-way" RKE systems are again typically encrypted for security purposes. "Two-way" RKE systems also may be either active or passive in nature.

In "two-way" RKE systems, communication from the vehicle-mounted device or unit to the portable remote control device or unit may be for any of a number of purposes, such as for prompting a passive remote control device to transmit a signal, acknowledging the receipt of a command signal from a remote unit, or others. In that regard, the remote control device or unit may be provided with a display, such as a liquid crystal or light emitting diode display, so that the vehicle owner or user can confirm that a command signal has been received by the vehicle-mounted device or unit and that the command has been effectuated (e.g., the vehicle doors have been locked/unlocked; the vehicle engine has been started).

For "two-way" RKE systems in particular, and especially those equipped for remote vehicle engine start, it is increasingly requested that such systems function at long distances from the vehicle. For example, it is often desired that such systems provide for communication between a remote unit and a vehicle control unit over ranges of more than 200 meters.

As previously noted, remote control units are hand-held, portable devices. For durability, the antenna of the remote unit is provided within a device housing, which reduces the antenna gain that can be achieved. Lower antenna gain constrains the operating range between the remote unit and the vehicle-mounted receiver and/or control unit over which transmitted signals can be reliably received.

In RF communication systems, range performance can be improved by using a low data rate for signal transmissions. Range performance can also be improved by increasing transmission power. Transmission power levels, however, are limited by Federal Communication Commission ("FCC") regulations in order to reduce interference with other signal transmissions. Transmission power can be maximized under FCC regulations by dividing or splitting a signal into multiple packets for transmission.

It is also desirable in RKE systems, however, to minimize latency, which may be described as the time required to receive and act on a command signal. The low data rate and data splitting described above that improve range performance in RKE systems also result in an increase in system latency.

Thus, there exists a need for an RKE systems that will enhance system range, and thus functionality, while also providing for acceptable system latency. Such an RKE system would include an adaptive protocol for signal transmission where the format for transmitted signals depends on the range or distance between the remote unit and the vehicle.

Referring now to the drawings, FIG. 1 is a simplified, exemplary environmental block diagram depicting one embodiment of an RKE system (10). The RKE system (10) comprises a portable remote control device or unit (12) and a vehicle-mounted device or unit (14). The remote unit (12) may be a separate fob or card, part of a vehicle ignition keyhead, or any other suitable configuration known in the art. The remote unit (12) transmits a wireless signal (16), which may be radio frequency ("RF") signal, that includes a command message. Remote unit (12) transmits signal (16) a distance or range (R) from the vehicle (18) in order to remotely perform a desired vehicle operation or function represented by the command message of signal (16), such as locking or unlocking vehicle doors, activating or deactivating a vehicle security system, activating or deactivating vehicle interior and/or exterior lights, starting the vehicle engine, and/or others. Such a transmission by remote unit (12) may be in response to user input, which may be provided to remote unit (12) in any fashion known in the art, such as actuation of a push-button or by voice recognition.

Signal (16) may be received at the vehicle-mounted unit (14), which may be mounted at any suitable location on the vehicle (18). Vehicle-mounted unit (14) relays the command message of the signal (16) to an appropriate vehicle function (20) in order to effectuate the command, such as locking or unlocking vehicle doors, activating or deactivating a vehicle security system, activating or deactivating vehicle interior and/or exterior lights, starting the vehicle engine, and/or others. In that regard, vehicle function (20) may be, for example, a computer, microprocessor, control circuit, logical device, vehicle system, vehicle device, or vehicle subsystem, or other. Relay of the command message by vehicle-mounted unit (14) may include translation of the command message of signal (16) into an output control signal. Vehicle-mounted unit (14) may be provided in direct communication with vehicle function (20), or may be provided in communication with vehicle function (20) indirectly, such as over a vehicle data or communications bus (not shown).

Referring now to FIG. 2, a simplified, exemplary block diagram depicting one embodiment of the RKE system (10) is shown. As seen therein, remote unit (12) comprises a transceiver (22) provided in communication with a controller (24). As used herein, the term "transceiver" means a transmitter and a receiver, whether combined or separate. Remote unit (12) may include one or more buttons or switches (26) which allow a user to provide input to remote unit (12). For example, as illustrated in FIG. 2, user input may be provided to remote unit (12) by actuation of a push-button (26) which interfaces with controller (24). Controller (24) may be a computer, microprocessor, control circuit or other logical device which executes application programs and/or which perform other logical exercises. Controller (24) is configured in any known suitable manner to generate signal (16), which may be in response to user input, and transceiver (22) is configured to transmit signal (16), which may include using any encryption method (e.g., rolling code), radio frequency (e.g., 315 MHz), encoding (e.g., Manchester) and/or any modulation scheme known in the art (e.g., on-off keyed ("OOK") modulation, other forms of amplitude shift keyed ("ASK") modulation, frequency shift keyed ("FSK") modulation, or others).

Vehicle-mounted unit (14) comprises a transceiver (30) provided in communication with a controller (32). Once again, as used herein, the term "transceiver" means a transmitter and a receiver, whether separate or combined. Transceiver (30) may be operative to receive signal (16). Controller (32) may be a computer, microprocessor, control circuit or other logical device which executes application programs and/or which perform other logical exercises. Controller (32) may be operative to process the command message of signal (16) received from transceiver (30), which may include decrypting, decoding and/or de-modulating signal (16). Controller (32) may be provided in direct or indirect communication with vehicle function (20) in order to perform the vehicle function or operation represented by the command message of signal (16), such as locking or unlocking vehicle doors, activating or deactivating a vehicle security system, activating or deactivating vehicle interior and/or exterior lights, starting the vehicle engine, and/or others.

Such a "two-way" RKE system (10) has the ability to determine the proximity or range (R) of the remote unit (12) to the vehicle (18) on which the device unit (14) is mounted. In that regard, remote unit (12) may be configured to transmit a special signal (34), which may be referred to as a pilot signal, for use in determining the range of the remote unit (12) from the device unit (14), and thus from the vehicle (18), vehicle function (20) and the device itself. Pilot signal (34) is received by transceiver (30) of vehicle-mounted unit (14), and controller (32) of vehicle-mounted unit (14) processes pilot signal (34) to determine the range (R) of remote unit (12) from the vehicle (18). Such a determination by controller (32) may be made in any fashion known in the art, such as by measuring the strength of the received pilot signal (34). Using transceiver (30), vehicle-mounted unit (14) subsequently transmits a signal (36) for receipt by transceiver (22) of remote unit (12). Signal (36) indicates the range (R) of remote unit (12) from vehicle (18) determined by controller (32), and may be referred to as a range signal.

Controller (24) of remote unit (12) is configured to use the indication of the range of the remote unit (12) from vehicle

(18) indicated by the received range signal (36) for selecting a particular protocol or format for subsequent use by transceiver (22) of remote unit (12) in transmitting a command signal (16). It should be noted here that transmission and receipt of pilot signal (34) and range signal (36) by remote unit (12) and vehicle-mounted unit (14) may take place immediately after remote unit (12) receives user input via push-button (26) indicative of a particular desired remote function. In that regard, such transmission and receipt of pilot signal (34) and range signal (36) takes place in a period of time on the order of 60 milliseconds.

As previously described, range performance can be improved in RKE system (10) by using a low data rate for signal transmissions, and/or by increasing signal transmission power within the limits allowed under FCC regulations by partitioning, dividing or splitting a signal into multiple packets. As also previously described, however, low data rate and data partitioning result in an increase in system latency.

Depending on the range (R) of remote unit (12) from vehicle (18), a different protocol or format may be selected by controller (24) for use by transceiver (22) of remote unit (12) for transmitting a command signal (16). That is, the RKE system (10) is adaptive in that a different protocol or format is used for signal transmission depending on range. More specifically, when received range signal (36) indicates that the range (R) of remote unit (12) from vehicle (18) exceeds a threshold distance, controller (24) of remote unit (12) selects a first protocol for use in transmitting command signal (16). Such a protocol may comprise a low data or bit rate, such as, for example, on the order of 1 K-bit/second. However, other low transmission data rates could be used, such as, for example, transmission bit rates in the range of approximately 500 bits/second to 2 K-bits/second.

Such a protocol may also or alternatively comprise data partitioning. That is, command signal (16) may be divided into multiple packets, where each packet includes a portion of the command signal (16). For example, command signal may be divided into four packets transmitted over a period of 400 milliseconds, where each packet may be 20 milliseconds in length, and may be transmitted serially with periods of 80 milliseconds between those packets. Other partitioning schemes or methods could also be used.

Such a protocol may also or alternatively comprise a particular fashion in which command signal (16) is modulated. In that regard, examples of modulation schemes known in the art include ASK, OOK and FSK. Any of these modulation schemes or others known in the art could be used.

Transceiver (30) of vehicle-mounted unit (14) is configured to receive command signal (16) having the low data rate and/or partitioned into multiple packets and/or having a particular modulation scheme. In that regard, where command signal (16) is transmitted as multiple packets, controller (34) of vehicle-mounted unit (14) is configured to assemble those received packets into command signal (16). The command message of signal (16) is subsequently effectuated as previously described.

Such a low data rate and/or partitioned signal protocol allows for higher transmission power and more reliable reception of command signal (16) by vehicle-mounted device (14) over the greater range, as previously described. While system latency may increase, such increased latency is acceptable given the greater distance of remote unit (12) from vehicle (18). That is, since the vehicle user operating remote unit (12) is at a greater distance from vehicle (18), a greater period of time exists for effectuating the desire remote function and the increased latency is not as perceptible to the vehicle user. Particular modulation schemes, such as, for example, ASK modulation, also improve or provide for greater operational range.

Alternatively, when received range signal (36) indicates that the range (R) of remote unit (12) from vehicle (18) fails to exceed the threshold distance, controller (24) of remote unit (12) selects a second protocol for use in transmitting command signal (16). Such a protocol may comprise a high data or bit rate, such as, for example, on the order of 10 K-bits/second. However, other transmission data rates could be used, such as, for example, transmission bit rates in the range of approximately 5 K-bits/second to 2 K-bits/second.

Such a protocol may also or alternatively comprise a particular fashion in which command signal (16) is modulated. In that regard, examples of modulation schemes known in the art include ASK, OOK and FSK. Any of these modulation schemes or others known in the art could be used.

Once again, transceiver (30) of vehicle-mounted unit (14) is configured to receive command signal (16) having the high data rate and/or particular modulation scheme The command message of signal (16) is again subsequently effectuated as described in detail above.

Such a high data rate signal protocol enables reception of command signal (16) by vehicle-mounted device (14) with a shorter system latency given the shorter range. That is, since the vehicle user operating remote unit (12) is in closer proximity to vehicle (18), a shorter period of time exists for effectuating the desire remote function and a shorter system latency is desired so as not to be as perceptible to the vehicle user. In addition, such a high data rate transmission at such a relatively shorter range can be undertaken using less transmission power. Particular modulation schemes, such as, for example, FSK modulation, also allow for a shorter operational range.

Referring now to FIG. 3, a simplified, exemplary flowchart depicting one embodiment of an RKE method (38) is shown. As seen therein, upon user actuation of a remote unit or fob push-button (40), the remote unit transmits a pilot signal (42). The pilot signal is received at the vehicle-mounted unit, which determines the range, distance or proximity of the remote unit from the vehicle-mounted unit based on the pilot signal (44). Once again, such a determination may be made in any known fashion, such as by measurement of the strength of the received pilot signal.

Thereafter, the vehicle-mounted unit transmits a signal that includes the determined range information (46), which signal is received by the remote unit (48). Based on that range information, the remote unit then selects a protocol or format for transmission of a command signal. In that regard, the remote unit determines if the range to the vehicle-mounted unit is less than a threshold distance (50). If so, the command signal is transmitted according to a protocol or format that comprises a high data or bit rate (52), such as, for example, on the order of 5 K-bit/second. However, other transmission data rates could be used, such as, for example, transmission bit rates in the range of approximately 5 K-bits/second to 20 K-bits/second.

Such a protocol may also or alternatively comprise a particular fashion in which the command signal is modulated. In that regard, examples of modulation schemes known in the art include ASK, OOK and FSK. Any of these modulation schemes or others known in the art could be used.

The vehicle-mounted unit then receives and responds to the command signal having the high data rate and/or particular modulation scheme (54). The command message of signal is subsequently effectuated as previously described, and action ends (56).

Such a high data rate signal protocol enables reception of the command signal by the vehicle-mounted unit with a shorter system latency given the relatively short range. That is, since the vehicle user operating the remote unit is in closer proximity to the vehicle, a shorter period of time exists for effectuating the desire remote function and a shorter system latency is desired so as not to be as perceptible to the vehicle user. In addition, such a high data rate transmission at such a relatively shorter range can be undertaken using less transmission power. Particular modulation schemes, such as, for example, FSK modulation, also allow for a shorter operational range.

However, if the range to the vehicle-mounted unit exceeds the threshold distance, the command signal is transmitted according to a protocol or format that comprises a low data or bit rate (58), such as, for example, on the order of 1 K-bit/second. Other transmission data rates could be used, however, such as, for example, transmission bit rates in the range of approximately 500 bits/second to 2 K-bits/second.

Such a protocol may also or alternatively comprise data partitioning. That is, the command signal may be divided into multiple packets, where each packet includes a portion of the command signal. For example, command signal may be divided into four packets transmitted over a period of 400 milliseconds, where each packet may be 20 milliseconds in length, and may be transmitted serially with periods of 80 milliseconds between those packets. Other partitioning schemes or methods could also be used.

Such a protocol may also or alternatively comprise a particular fashion in which command signal (16) is modulated. In that regard, examples of modulation schemes known in the art include ASK, OOK and FSK. Any of these modulation schemes or others known in the art could be used.

If all packets have not been transmitted (60), transmission of the packets continues (58). When all packets have been transmitted (60), transmission of the packets ceases, and the vehicle-mounted unit assembles the packets and responds (62). The command message of the signal is subsequently effectuated as previously described, and action ends (56).

Such a low data rate and/or partitioned signal protocol allows for higher transmission power and more reliable reception of command signal by vehicle-mounted device over the greater range, as previously described. While system latency may increase, such increased latency is acceptable given the greater distance of the remote unit from the vehicle. That is, since the vehicle user operating the remote unit is at a greater distance from the vehicle, a greater period of time exists for effectuating the desire remote function and the increased latency is not as perceptible to the vehicle user. Particular modulation schemes, such as, for example, ASK modulation, also improve or provide for greater operational range.

It should be noted that the method of FIG. 3 as described herein is exemplary only, and that the functions or steps of the method could be undertaken other than in the order described and/or simultaneously as may be desired, permitted and/or possible.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for remote activation of a device, the system comprising:
   a remote unit comprising
     a transceiver for
       transmitting a pilot signal for use in determining a range of the remote unit from the device, wherein the pilot signal lacks a command for activation of the device,
       receiving a signal indicative of a range from the device, and
       transmitting a command signal according to one of a first transmission protocol and a second transmission protocol, wherein the first transmission protocol comprises a first data rate and the second transmission protocol comprises a second data rate different from the first data rate, and
     a controller for
       comparing the range to a threshold,
       selecting the first transmission protocol for use in transmitting a command signal when the range exceeds the threshold, and
       selecting the second transmission protocol for use in transmitting a command signal when the range fails to exceed the threshold,
       wherein the controller compares the range to a threshold and selects one of the first and second transmission protocols for an initial command signal transmission following a user input to the remote unit.

2. The system of claim 1 wherein the received range signal comprises data representing the range from the device.

3. The system of claim 1 further comprising a device unit, the device unit comprising:
   a transceiver for receiving the pilot signal transmitted by the remote unit transceiver, and transmitting the range signal; and
   a controller for determining the range from the device based on the pilot signal.

4. The system of claim 1 wherein the first transmission protocol comprises a first data rate and partition of the command signal, and wherein the second transmission protocol comprises a second data rate greater than the first data rate.

5. The system of claim 1 wherein the first transmission protocol comprises a first modulation scheme and the second transmission protocol comprises a second modulation scheme different than the first modulation scheme.

6. The system of claim 4 wherein partition of the command signal comprises dividing the command signal into a plurality of packets, each packet for transmission by the transceiver.

7. The system of claim 6 further comprising a device unit, the device unit comprising:
   a transceiver for receiving the plurality of packets transmitted by the remote unit transceiver when the first transmission protocol is selected, and receiving the command signal transmitted by the remote unit transceiver when the second transmission protocol is selected; and
   a controller for assembling the plurality of packets into the command signal when the first transmission protocol is selected.

8. A system for remote activation of a device, the system comprising:
   a device unit comprising
     a transceiver for
       receiving a pilot signal transmitted by a remote unit, wherein the pilot signal lacks a command for activation of the device,
       transmitting a signal comprising data representing a range of the remote unit from the device, and
       receiving a command signal transmitted by the remote unit according to one of a first transmission protocol and a second transmission protocol, wherein the first transmission protocol comprises a first data rate and the second transmission protocol comprises a second data rate different from the first data rate, and a controller for determining the range from the device based on the pilot signal.

9. The system of claim 8 wherein the first transmission protocol comprises a first data rate and partition of the command signal, and wherein the second transmission protocol comprises a second data rate greater than the first data rate.

10. The system of claim 9 wherein partition of the command signal comprises dividing the command signal into a plurality of packets, each packet for transmission by the remote unit transceiver.

11. The system of claim 10 wherein the device unit transceiver receives the plurality of packets transmitted according to the first transmission protocol and the controller assembles the plurality of packets into the command signal.

12. The system of claim 8 wherein the first transmission protocol comprises a first modulation scheme and the second transmission protocol comprises a second modulation scheme different than the first modulation scheme.

13. The system of claim 8 further comprising a remote unit, the remote unit comprising:

a transceiver for
  transmitting the pilot signal,
  receiving the range signal, and
  transmitting a command signal according to one of the first transmission protocol and the second transmission protocol; and a controller for
  comparing the range to a threshold,
  selecting the first transmission protocol for use in transmitting a command signal when the range exceeds the threshold, and
  selecting the second transmission protocol for use in transmitting a command signal when the range fails to exceed the threshold,
  wherein the controller compares the range to a threshold and selects one of the first and second transmission protocols for an initial command signal transmission following a user input to the remote unit.

14. A method for remote activation of a device, the method comprising:

receiving a signal comprising data representing a range from the device;

comparing the range to a threshold;

selecting a first transmission protocol when the range exceeds the threshold;

selecting a second transmission protocol when the range fails to exceed the threshold; and transmitting a command signal according to the selected one of the first transmission protocol and the second transmission protocol, wherein an initial command signal transmission following a user input is based on the comparison of the range to a threshold and the selection of one of the first and second transmission protocols, and wherein the first transmission protocol comprises a first data rate and the second transmission protocol comprises a second data rate different from the first data rate.

15. The method of claim 14 wherein the first transmission protocol comprises a first data rate and partition of the command signal, and wherein the second transmission protocol comprises a second data rate greater than the first data rate.

16. The method of claim 14 wherein the first transmission protocol comprises a first modulation scheme and the second transmission protocol comprises a second modulation scheme different than the first modulation scheme.

17. The method of claim 14 further comprising transmitting a pilot signal for use in determining the range from the device, the pilot signal lacking a command for activation of the device.

* * * * *